Patented May 15, 1934

1,958,860

UNITED STATES PATENT OFFICE 1,958,860

WETTING-OUT AGENT

Oscar A. Pickett, Wilmington, Del., assignor to Hercules Powder Company, Wilmington, Del., a corporation of Delaware No Drawing. Application January 18, 1932, Serial No. 587,448

3 Claims. (Cl. 252—1)

This invention relates to a new wetting-out agent, specifically a wetting-out agent in which sulfonated dipolymer or its salts are used.

Wetting-out agents, as their name implies, are substances which, when added to water or solutions of various kinds, enable fibers, powders or substances in general to be wetted more readily than would otherwise be the case. Quite small additions of some wetting-out agents exercise a remarkable effect on the speed and efficiency with which a fiber, such as wool, for example, can be made wet with water.

Not only are these agents of value for wetting-out fibers, but they are also of service in pasting dye stuffs, powders, etc. which are sometimes extremely difficult to paste with water alone. The classes of compounds used for this purpose are of a very diverse nature, but they all possess the property of considerably reducing the surface tension of water, a property which may be a measure of their efficiency as wetting-out agents. Ordinary soaps, the alkali salts of fatty acids, are the oldest and perhaps the most efficient wetting-out agents but their use is somewhat circumscribed by the fact that they possess certain serious disadvantages. For example, they cannot be used in acid solutions and form sticky, insoluble lime and magnesium soaps with hard water, these soaps being very difficult to remove from the fiber.

Certain new wetting-out agents have been put on the market, and, while they do not possess the above disadvantages, they all fall somewhat short of soap in efficiency.

Dipolymer may be sulfonated by treatment with concentrated or fuming sulphuric acid or chlorsulphonic acid to produce a sulphonate capable of forming metallic salts.

This dipolymer, as the term is herein employed, is a product consisting of polymerized terpene hydrocarbons and is produced by the polymerization of dipentene, turpentine or pine oil by various methods. The sulfonated dipolymer and its alkali salts are found to be very effective as wetting-out agents, since both the sulfonated dipolymer and its calcium, magnesium and similar salts are somewhat soluble in water. It or its derivatives may be used in acidic solutions and hard water as contrasted with soap.

In the previous use of sulfonated dipolymer or its alkali salts as wetting-out agents, the sulfonated dipolymer or its salts have been used together with pine oil, whereby, when the mixture is added to water or an aqueous solution an emulsion is formed, the sulfonated dipolymer or its salts acting as an emulsifying agent.

One standard mixture heretofore used has consisted of 70 parts of pine oil and 30 parts of the sodium salt of sulfonated dipolymer.

It has now been found in accordance with the present invention that by adding a minimum amount of true soaps, such as sodium linoleate, sodium oleate or sodium palmitate, or the like, to the standard 70—30 mixture mentioned above, certain advantages are attained, including the vanishing of the previous opacity, lightening of color and marked increase of wetting-out speed. Since the added product is strictly a soap, being an alkali salt of a higher saturated or unsaturated fatty acid, and since experience has shown that alkali salts of sulfo-derivatives are superior to straight soaps in a dye bath, because they are more stable towards acid and alkali, by adding a minimum amount of soap to the standard mixture a wetting-out agent is obtained, having not only the advantageous properties of the previous wetting-out agents but certain additional properties seemingly peculiar to the mixture.

As an example of one formula, which is found to give wetting-out results far superior to those obtained by the use of sulfonated fatty compounds, such as castor oil or the like, the following may be cited:

| | Per cent |
|---|---|
| Pine oil | 65 |
| Sulfonated dipolymer | 27 |
| Sodium linoleate | 8 |

The wetting-out properties of this specific mixture compare about as follows:

Other agents (sulpho-derivatives of fats)—13 seconds 70—30 pine oil and sodium dipolymer sulfonate—6 seconds—above mixture—4.5 seconds.

The mixture above may be widely varied to suit specific uses. For example, while pine oil is preferred, other suitable oils such as hexalin, or tetralin may be substituted. Either sulfonated dipolymer or its alkali or alkali earth salts may be used, the latter, for example, including the sodium, potassium or calcium salts. The sulfonated dipolymer itself is apparently usable by reason of the fact that the added soap imparts alkalinity to the mixture, this alkalinity being sufficient to produce a stable emulsion. As for the soap, any of the usual soaps may be used; for example, as indicated above, sodium or potassium linoleate, oleate, palmitate, stearate, or the like.

Inasmuch as in the composition herein described either the sulfonated dipolymer or its salts may be used, the salts are intended to be covered as equivalents in the following claims which call for the inclusion of sulfonated dipolymer.

What I claim and desire to protect by Letters Patent is:

1. A wetting-out agent including an oil, a sulphonated polymerized terpene hydrocarbon and a soap.

2. A wetting-out agent including an oil, an alkali salt of a sulphonated polymerized terpene hydrocarbon, and a soap.

3. A wetting-out agent including pine oil, a sulphonated polymerized terpene hydrocarbon and a soap.

OSCAR A. PICKETT.